United States Patent Office 2,828,207
Patented Mar. 25, 1958

2,828,207

FORTIFICATION OF FEED

Lawrence Fullhart, Jr., Newark, Del., assignor to E. I. du Pont de Nemours and Company, Wilmington, Del., a corporation of Delaware No Drawing. Application November 14, 1955
Serial No. 546,789

7 Claims. (Cl. 99—2)

This invention relates to the fortification of feed and more particularly it relates to foodstuff for warm-blooded animals, including human beings, fortified with one or more essential amino acids combined with a cation exchange resin.

It has heretofore been suggested that foodstuffs such as bread, milk, animal feeds, and the like, may be advantageously fortified with essential amino acids. The amino acids commonly considered to be essential include methionine, lysine, arginine, histidine, tyrosine, tryptophane, phenylalanine, threonine, leucine, isoleucine, and glycine. The particular essential amino acids to be added to a feed or foodstuff will be dependent upon the use to be made of such feed since different animals have considerably different requirements of the amino acids, both as to kind and amount. The addition of lysine, methionine, and tryptophane has been suggested for nearly all feeds and foodstuffs.

In practice, the fortification of foodstuff with essential amino acids, although exceedingly valuable, has not been wholly satisfactory. Not only are the essential amino acids very expensive chemicals but they are often too quickly released in the animal or human body to obtain full efficiency. Moreover, the more commonly used amino acids, such as lysine and methionine, are not sufficiently stable and, therefore, have a short shelf life and are largely lost in the baking of foodstuff containing the same.

It is, therefore, an object of this invention to provide a method of combining these amino acids with foodstuff whereby their stability in the foodstuff will be improved and whereby their efficiency in foodstuff will be increased by slowing their release in the body.

It is another object of this invention to provide an improved method for the fortification of foodstuff with essential amino acids.

It is a further object of this invention to prepare an improved amino acid fortified foodstuff.

Other objects of this invention will appear hereinafter.

The objects of this invention may be acomplished, in general, by fortifying foodstuff with an adduct of an essential amino acid and a cation exchange resin. By an "adduct" of these materials is meant a combination thereof obtained by passing an aqueous solution of the amino acid through a cation exchange resin whereby the amino acid is absorbed by such resin in accordance with cation exchange principle.

The amino acid-cation exchange resin adduct should contain between 10% and 70% by weight of the amino acid or acids, the preferred range being 25% to 60%, by weight.

The amount of the adduct added to a foodstuff may vary greatly with the requirement of the particular foodstuff for the particular amino acid in the adduct. This may, for example, vary between 0.1% to 10% by weight of the foodstuff.

The fortification of foodstuff in accordance with this invention is applicable to foodstuff for human beings as well as foodstuff for all warm-blooded animals including chickens, hogs, cows, sheep, goats, and dogs. Not only will such fortification improve the efficiency of animals for all feeds but it will permit the feeding of materials which are normally unsuitable because of the absence or deficiency of one or more of the essential amino acids.

The amino acid adducts are more stable to chemical change, especially at elevated temperatures, than the acids alone. This increased stability of amino acid is important in feeds that are subject to extended periods of storage. Once the amino acid-cation exchange resin adduct has been consumed by the animal, it possesses the important factor of slow release of the amino acid in the body, so that there will be a supply of the essential acid when needed.

When used in foodstuffs for human consumption, the increased stability of the adduct when exposed to elevated temperatures is of importance. This is especially true with lysine. For example, with baked food fortified with lysine, the amino acid is largely destroyed during baking. Such lysine destruction is largely avoided by the addition of the lysine as a lysine-cation exchange resin adduct. Thus, the addition to foodstuff of the amino acid in the form of a cation exchange resin adduct leads to a considerable saving in the amount of acid needed.

As above stated, the amino acid-cation exchange resin adducts may be made from any of the essential amino acids and cation exchange resins by passing an aqueous solution of the acid through the resin in finely divided form.

Cation exchange resins are well known in the art and are commercially available from a number of sources. Cation exchange resins are high-polymeric, tightly cross-linked structures containing polar anionic groups which are balanced by cations. Cation exchange resins are essentially highly insoluble electrolytes consisting of an enormous non-diffusible anion and a simple diffusible cation. Since the ionic character of these resins is primarily determined by the polar groups, such as the sulfonic, carboxylic, phenolic, or phosphonic groups, and is quite independent (except for physical properties) of the non-polar portion of the resin structure, the remainder of the resin may be ignored insofar as its function in the present invention.

The literature refers to many different cation exchange resins whose exchange activities are associated with the sulfonic, carboxylic acid, and phenolic groups contained therein. Such resins may be made by the sulfonation of coal, lignite, peat, phenol-formaldehyde polymers, styrene-divinyl benzene polymers, by the reaction of phenol, acrolein and the semi-amide of oxamic acid, and other processes as disclosed in U. S. Patent No. 2,366,007 and the textbook "Ion Exchange Resins" by Kunin and Myers, 1950, John Wiley & Sons, Inc., New York, N. Y.

The preferred cation exchange resins, for the formation of amino acid resin adducts, for use in this invention, are those defined as having an apparent ionization constant of 2–6 in the above-mentioned Kunin and Myers textbook, page 27.

Such cation exchange resins are readily available from the following named organizations under the tabulated names set forth below:

Rohm & Haas Chemical Co.—"Amberlite" IRC–50, a phenolic cation exchange resin containing carboxylic acid polar groups.

Rohm & Haas Chemical Co.—"Amberlite" IR–100, a phenolic cation exchange resin containing methylene sulfonic polar groups.

Rohm & Haas Chemical Co.—"Amberlite" XE–69, a phenolic cation exchange resin containing methylene sulfonic polar groups.

Rohm & Haas Chemical Co.—"Amberlite" XE-64, a phenolic cation exchange resin containing carboxylic acid polar groups.

Dow Chemical Co.—"Nalcite" HCR, a cation exchange resin containing nuclear sulfonic polar groups.

American Cyanamid Co.—"Ionac" C-200, a phenolic cation exchange resin containing methylene sulfonic polar groups.

The following examples are given to illustrate the preparation of suitable amino acid-cation exchange resin adducts.

EXAMPLE I

A mixture of 225 grams L-lysine, 275 grams "Amberlite" XE-69 sulfonic acid cation exchange resin ($H^+$ form, dried at 50–60° C.) sold by the Rohm & Haas Chemical Company, and one liter of distilled water is stirred for four hours. The solid is separated from the mixture, freed of most of the liquid, washed several times with acetone, and then dried at 50°–55° C. overnight. The resulting adduct weighs 407 grams and contains 32.4% L-lysine, by weight.

EXAMPLE II

A mixture of 110 grams of L-lysine, 80 grams of "Amberlite" XE-64 carboxylic acid type cation exchange resin ($H^+$ form, dried at 50–60° C.) sold by the Rohm & Haas Chemical Company, and 500 milliliters of water is stirred for four hours. The solid is separated from the mixture, freed of most of the liquid, washed with acetone, and dried at 50–55° C. The resulting adduct weighs 180 grams and contains 55.5% by weight of lysine.

EXAMPLE III

One hundred and fifty-five (155) grams of the $H^+$ form of the sulfonic acid type cation exchange resin "Nalcite" HCR, sold by the Dow Chemical Company, is placed in a glass column.

A similar column, containing 280 grams of the weakly basic anion exchange resin "Amberlite" IR-4B, sold by the Rohm & Haas Chemical Company, is connected to the first column.

A 10% aqueous solution containing 200 grams of L-lysine hydrochloride is passed through both columns repeatedly until a titre with NaOH on two consecutive passes through the "Nalcite" HCR showed little or no change.

EXAMPLE IV

An aqueous solution comprising 100 grams of L-lysine hydrochloride in one liter of water is slowly passed through a column containing 100 grams of the $NH_4^+$ form of a sulfonic acid cation exchange resin. The column is then washed repeatedly with distilled water and finally in turn with alcohol and acetone. The resulting adduct is separated and dried to constant weight. The adduct weighs 133 grams and the lysine content is 25%.

EXAMPLE V

A mixture of 100 grams of DL-methionine, 3.5 liters of water, and 165 grams of the $H^+$ form of sulfonic acid type cation exchange resin sold by the Dow Chemical Company under the name "Nalcite" HCR is stirred for one hour at room temperature. A second 100-gram portion of methionine is then added and stirring continued for another hour. The solid adduct is separated from the mixture by filtering and is washed, in turn, with water, alcohol, and acetone. The solid content is then dried to constant weight at 50° C. This adduct weighs 264 grams and contains 27.5% DL-methionine.

Amino acid-cation exchange resin adducts may be prepared with two or more different amino acids in the same manner as described in Examples I to V.

The adducts may be added to feeds and foodstuffs such as are commonly consumed by human beings and other warm-blooded animals to supply any deficiency of amino acids in such foods.

Rat and chicken growth experiments with feeds fortified with DL-lysine and DL-methionine, and with DL-lysine-"Nalcite" HCR and DL-methionine adducts show a better growth response with the adduct than with free lysine or methionine. The results of two experiments are summarized in the following Tables I and II.

Table I
RAT DIET EXPERIMENTS

| Diet | Percent L-lysine | 5-Week Gains (Grams) | |
|---|---|---|---|
| | | Expt. #1 | Expt. #2 |
| Bread Basal | | 45.8 | 35 |
| Bread Basal+0.25% DL-lysine.HCl | 0.1 | 77.4 | 59 |
| Bread Basal+0.56% DL-lysine "Nalcite" HCR adduct | 0.08 | 92.8 | 100 |
| Bread Basal+0.5% DL-lysine.HCl | 0.2 | 122.6 | 128 |
| Bread Basal+1.12% DL-lysine "Nalcite" HCR adduct | 0.17 | 143.6 | 156 |

BREAD BASAL FOR RAT DIET EXPERIMENTS

| Material | Percent of Diet |
|---|---|
| Bread Crumbs | 90.00 |
| Vitamin Mix | 1.00 |
| Biotin or Starch | 1.00 |
| Hubbell Salts 351 ("J. Nutrition" 14, 273, 1937) | 3.00 |
| Soybean Oil | 4.50 |
| Cod Liver Oil | 0.50 |
| Lysine on Resin | (1) |

[1] 0.25% lysine added at expense of bread.

Table II
CHICKEN DIET EXPERIMENTS

| Diet | 5-Week Gains (Grams) | Feed Efficiency [1] |
|---|---|---|
| Basal+0.75% DL-methionine | 377 | 2.49 |
| Basal+0.75% DL-methionine on "Nalcite" HCR resin | 375 | 2.38 |

[1] Feed efficiency represents the number of weight units of feed to produce one weight unit of gain.

BASAL FOR CHICKEN DIET EXPERIMENTS

| Material | Percent of Diet |
|---|---|
| Yellow Corn | 42.93 |
| Soy Bean Oil Meal | 20.00 |
| Ground Barley | 10.00 |
| Wheat Flour Middlings | 10.00 |
| Corn Gluten Meal | 5.00 |
| Wheat Bran | 5.00 |
| Alfalfa Meal | 3.00 |
| Calcium Phosphate, Tribasic | 1.75 |
| Ca Carbonate | 0.75 |
| Iodized Salt | 0.75 |
| $MnSO_4$ | 0.50 |
| "Delsterol" (2,000 A. O. A. C. units D./gm.) | 0.02 |
| Vitamin Supplement [2] | 0.05 |
| | 1.00 |

[2] Vitamin supplement—each gram of supplement contains the following amounts of materials:

| Material | Mg/g. |
|---|---|
| Thiamine.HCl | 0.150 |
| Riboflavin | 1.000 |
| Niacin | 0.507 |
| Pyridoxine.HCl | 0.135 |
| Calcium Pantothenate | 0.507 |
| Folic Acid | 0.012 |
| Manadione | 0.500 |
| Choline Chloride | 7.750 |
| Vitamin $B_{12}$ | 0.000165 |

The following examples illustrate the heat stabilizing effect produced by absorbing the amino acid on a cation exchange resin. In each example the dough was prepared from a commercial hot roll mix (Duff's Hot Roll Mix) to which was added 0.2% L-lysine hydrochloride and 0.2% L-lysine as the cation exchange resin adduct. A control was prepared without lysine for taste comparison.

EXAMPLE VI

Three loaves of bread were prepared, one with no lysine, one with 0.2% L-lysine hydrochloride, and one with an amount of L-lysine "Nalcite" HCR adduct (35% lysine) to produce a product containing 0.2% L-lysine. The bread was baked at 200° C. for thirty-five minutes. The bread was analyzed for lysine after baking.

| Lysine added as— | Percent Loss of Lysine in Baking |
| --- | --- |
| L-lysine hydrochloride | 23.3 |
| L-lysine-"Nalcite" HCR adduct | 11.9 |

EXAMPLE VII

Example VI was repeated with L-lysine-"Nalcite" HCR adduct substituted by L-lysine-"Amberlite" IRC–50 adduct containing 52.5% lysine. The amount of the L-lysine-"Amberlite" IRC–50 adduct added to the dough was such as to incorporate therein 0.2% L-lysine. The bread was baked at 165°–200° C. for forty-five minutes.

| Lysine added as— | Percent Loss of Lysine in Baking |
| --- | --- |
| L-lysine hydrochloride | 18.7 |
| L-lysine-"Amberlite" IRC–50 adduct | 7.7 |

In a taste test by at least six people, the taste of bread prepared with L-lysine-cation exchange resin adduct was preferred by the majority over the bread prepared with L-lysine hydrochloride or the bread baked without lysine.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A foodstuff for warm-blooded animals fortified with an amino acid cation exchange resin adduct.

2. A foodstuff for warm-blooded animals fortified with an adduct of an amino acid and a cation exchange resin having an apparent ionization constant of 2–6.

3. A foodstuff for warm-blooded animals fortified with an adduct of an amino acid taken from the group consisting of lysine and methionine and a cation exchange resin having an apparent ionization constant of 2–6.

4. A foodstuff for warm-blooded animals fortified with an adduct of an amino acid taken from the group consisting of lysine and methionine and a cation exchange resin having polar groups from the class consisting of sulfonic and carboxylic acid groups.

5. A baked foodstuff for warm-blooded animals fortified with an adduct of an amino acid taken from the group consisting of lysine and methionine and a cation exchange resin having polar groups from the class consisting of sulfonic and carboxylic acid groups.

6. The method of increasing the feed efficiency of foodstuff for warm-blooded animals which comprises forming an adduct of an amino acid with a cation exchange resin and mixing said adduct with said foodstuff.

7. The method of increasing the feed efficiency of foodstuff for warm-blooded animals which comprises forming an adduct of an amino acid taken from the group consisting of lysine and methionine with a cation exchange resin and mixing said adduct with said foodstuff.

References Cited in the file of this patent

UNITED STATES PATENTS

| | | |
| --- | --- | --- |
| 2,536,360 | Emmick et al. | Jan. 2, 1951 |
| 2,549,378 | Kunin | Apr. 17, 1951 |
| 2,677,670 | Kunin et al. | May 4, 1954 |
| 2,739,063 | Wehrmeister | Mar. 20, 1956 |